United States Patent
Boaz et al.

(10) Patent No.: US 9,614,297 B2
(45) Date of Patent: *Apr. 4, 2017

(54) ELECTRICAL CONNECTORS

(71) Applicant: Blazing Products, Inc., Chesterfield, MO (US)

(72) Inventors: Aaron Boaz, St. Louis, MO (US); Duane K. Smith, St. Charles, MO (US); Douglas L. Kirk, Ballwin, MO (US)

(73) Assignee: BLAZING PRODUCTS, INC., Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,094

(22) Filed: May 18, 2015

(65) Prior Publication Data

US 2015/0325931 A1    Nov. 12, 2015

Related U.S. Application Data

(63) Continuation of application No. 13/667,218, filed on Nov. 2, 2012, now Pat. No. 9,035,184.

(Continued)

(51) Int. Cl.
*H01R 4/22* (2006.01)
*H02G 15/08* (2006.01)
*H01R 4/24* (2006.01)

(52) U.S. Cl.
CPC .............. *H01R 4/22* (2013.01); *H02G 15/08* (2013.01)

(58) Field of Classification Search
CPC ...................................... H01R 4/22

(Continued)

(56) References Cited

U.S. PATENT DOCUMENTS

D118,588 S    1/1940  Blackburn
2,975,392 A   3/1961  Ludwig
(Continued)

FOREIGN PATENT DOCUMENTS

CH    567338         9/1975
DE    39 42 520      6/1991
(Continued)

OTHER PUBLICATIONS

ExxonMobil Chemical, "Butyl Polymers", 2002, may be seen at www.exxonmobilchemical.com/Public_Products/Butyl_Polymers/Worldwide, printed Apr. 18, 2005, 1 page.

(Continued)

*Primary Examiner* — Michael F McAllister
(74) *Attorney, Agent, or Firm* — Harness, Dickey & Pierce, P.L.C.

(57) ABSTRACT

An electrical connector for electrically connecting wires includes first and second members pivotally coupled together. The first member has an opening and the second member has a receptacle, where the opening of the first member and the receptacle of the second member are configured to generally align when the first and second members are in a first position such that wires can be inserted through the opening of the first member and into the receptacle of the second member for electrically connecting the wires. A metallic coil is positioned within the receptacle of the second member and configured to electrically connect the wires. And, a sleeve is positioned adjacent the receptacle of the second member, generally above the metallic coil, for holding insulating material in the electrical connector to help coat the wires when the wires are received into the electrical connector.

19 Claims, 14 Drawing Sheets

Related U.S. Application Data

(60) Provisional application No. 61/555,333, filed on Nov. 3, 2011.

(58) Field of Classification Search
USPC .................................................. 174/87
See application file for complete search history.

(56) References Cited

U.S. PATENT DOCUMENTS

| | | |
|---|---|---|
| 3,124,409 A | 3/1964 | Nisula |
| 3,139,315 A | 6/1964 | Luis et al. |
| D223,611 S | 5/1972 | Anderson |
| 3,675,182 A | 7/1972 | Gregory |
| 3,836,941 A | 9/1974 | Izraeli |
| 3,936,128 A | 2/1976 | D'Annessa et al. |
| 3,973,822 A | 8/1976 | Sugimoto |
| 3,990,129 A | 11/1976 | Cornell et al. |
| 4,014,078 A | 3/1977 | Cornell et al. |
| 4,077,697 A | 3/1978 | Yates |
| 4,103,984 A | 8/1978 | Mixon, Jr. |
| 4,103,986 A | 8/1978 | Izraeli |
| 4,269,465 A | 5/1981 | Mueller |
| 4,277,124 A | 7/1981 | Loose et al. |
| 4,437,723 A | 3/1984 | Narozny |
| 4,444,447 A | 4/1984 | Markwardt |
| 4,548,462 A | 10/1985 | Cornell |
| 4,561,682 A | 12/1985 | Tisserat |
| 4,564,256 A | 1/1986 | Damiano et al. |
| 4,611,872 A | 9/1986 | Ito et al. |
| 4,653,831 A | 3/1987 | Wilson et al. |
| 4,673,233 A | 6/1987 | Hertelendy |
| 4,842,546 A | 6/1989 | Song |
| 4,983,932 A | 1/1991 | Kitagawa |
| 4,995,827 A | 2/1991 | Rudoy |
| 4,995,829 A * | 2/1991 | Geib ............... H01R 4/2433 439/409 |
| D315,139 S | 3/1991 | Biaha |
| D315,143 S | 3/1991 | Biaha |
| 5,030,136 A | 7/1991 | Reinhardt et al. |
| 5,041,012 A | 8/1991 | Caprio |
| 5,162,772 A | 11/1992 | May |
| D333,121 S | 2/1993 | Craveiro |
| 5,254,015 A | 10/1993 | Robertson |
| 5,281,164 A | 1/1994 | Gan |
| 5,306,195 A | 4/1994 | Hayashi |
| 5,427,270 A | 6/1995 | Patterson |
| 5,470,250 A | 11/1995 | Hawk et al. |
| 5,557,070 A | 9/1996 | Tamm |
| 5,765,962 A | 6/1998 | Cornell et al. |
| 5,922,992 A | 7/1999 | Kinney et al. |
| 6,120,334 A | 9/2000 | Timsit et al. |
| 6,135,804 A | 10/2000 | Lux |
| 6,152,759 A | 11/2000 | Daoud et al. |
| 6,241,563 B1 | 6/2001 | Warner et al. |
| 6,250,948 B1 | 6/2001 | Daoud |
| 6,414,243 B1 | 7/2002 | Korinek et al. |
| D484,400 S | 12/2003 | Blake et al. |
| 6,732,983 B1 | 5/2004 | Blake et al. |
| 6,784,370 B1 | 8/2004 | Keswani et al. |
| 6,815,616 B1 * | 11/2004 | King, Jr. ............... H01R 4/22 174/87 |
| 6,863,558 B2 | 3/2005 | Negishi et al. |
| 6,958,449 B1 | 10/2005 | Ziebart |
| 7,066,764 B2 | 6/2006 | Bolouri-Saransar |
| 7,122,742 B2 * | 10/2006 | King, Jr. ............... H01R 4/22 174/87 |
| D533,509 S | 12/2006 | Wu |
| 7,144,269 B2 | 12/2006 | Libby et al. |
| 7,170,005 B1 | 1/2007 | King, Jr. et al. |
| 7,335,050 B2 | 2/2008 | Kirk et al. |
| D575,230 S | 8/2008 | Bishop et al. |
| D575,738 S | 8/2008 | Kirk et al. |
| 7,789,695 B2 * | 9/2010 | Radle ............... H01R 4/2433 439/402 |
| 7,806,718 B2 | 10/2010 | King et al. |
| 9,035,184 B2 | 5/2015 | Boaz et al. |
| 2007/0004269 A1 | 1/2007 | Kirk et al. |
| 2013/0153259 A1 | 6/2013 | Boaz et al. |

FOREIGN PATENT DOCUMENTS

| | | |
|---|---|---|
| EP | 1492199 | 12/2004 |
| FR | 2254133 | 7/1975 |
| WO | WO 01/91239 | 11/2001 |

OTHER PUBLICATIONS

Correct Wire Splicing Technique, http:www.chamberlainaccess.com/cas/HtmlResources/cas/PDF/QuickDocs/Correct_Splicing_Techniques.pdf, last updated Mar. 14, 2003, 5 pages.

* cited by examiner

ELECTRICAL CONNECTORS

CROSS-REFERENCE TO RELATED APPLICATION

This application is a continuation of U.S. patent application Ser. No. 13/667,218 filed Nov. 2, 2012, which claims the benefit of U.S. Provisional Application No. 61/555,333, filed Nov. 3, 2011. The entire disclosures of each of these applications are incorporated herein by reference.

FIELD

The present disclosure generally relates to electrical connectors that can be used, for example, to electrically connect wires and methods related thereto.

BACKGROUND

This section provides background information related to the present disclosure which is not necessarily prior art.

Electrical connectors are often used for connecting various electrical components of electrical equipment or systems. By way of example, both lawn sprinkler systems and landscape lighting systems include a plurality of electrical components that are typically connected using electrical connectors.

SUMMARY

This section provides a general summary of the disclosure, and is not a comprehensive disclosure of its full scope or all of its features.

Example embodiments of the present disclosure generally relate to electrical connectors for electrically connecting wires (and related methods of making, using, etc. the electrical connectors). In one example embodiment, an electrical connector generally includes first and second members pivotally coupled and moveable between a first position and a second position. The first member has an opening and the second member has a receptacle. The opening of the first member and the receptacle of the second member are configured to generally align when the first and second members are in the first position such that wires can be inserted through the opening of the first member and into the receptacle of the second member for electrically connecting the wires.

In another example embodiment, an electrical connector generally includes a first member and a second member. The second member is pivotally coupled to the first member, and includes a receptacle configured to receive wires to be connected into the electrical connector. The electrical connector also includes a metallic coil positioned within the receptacle of the second member and configured to make an electrical connection between the wires received into the electrical connector, and a sleeve positioned adjacent the receptacle of the second member and configured to hold insulating material to help coat the wires when the wires are received into the electrical connector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
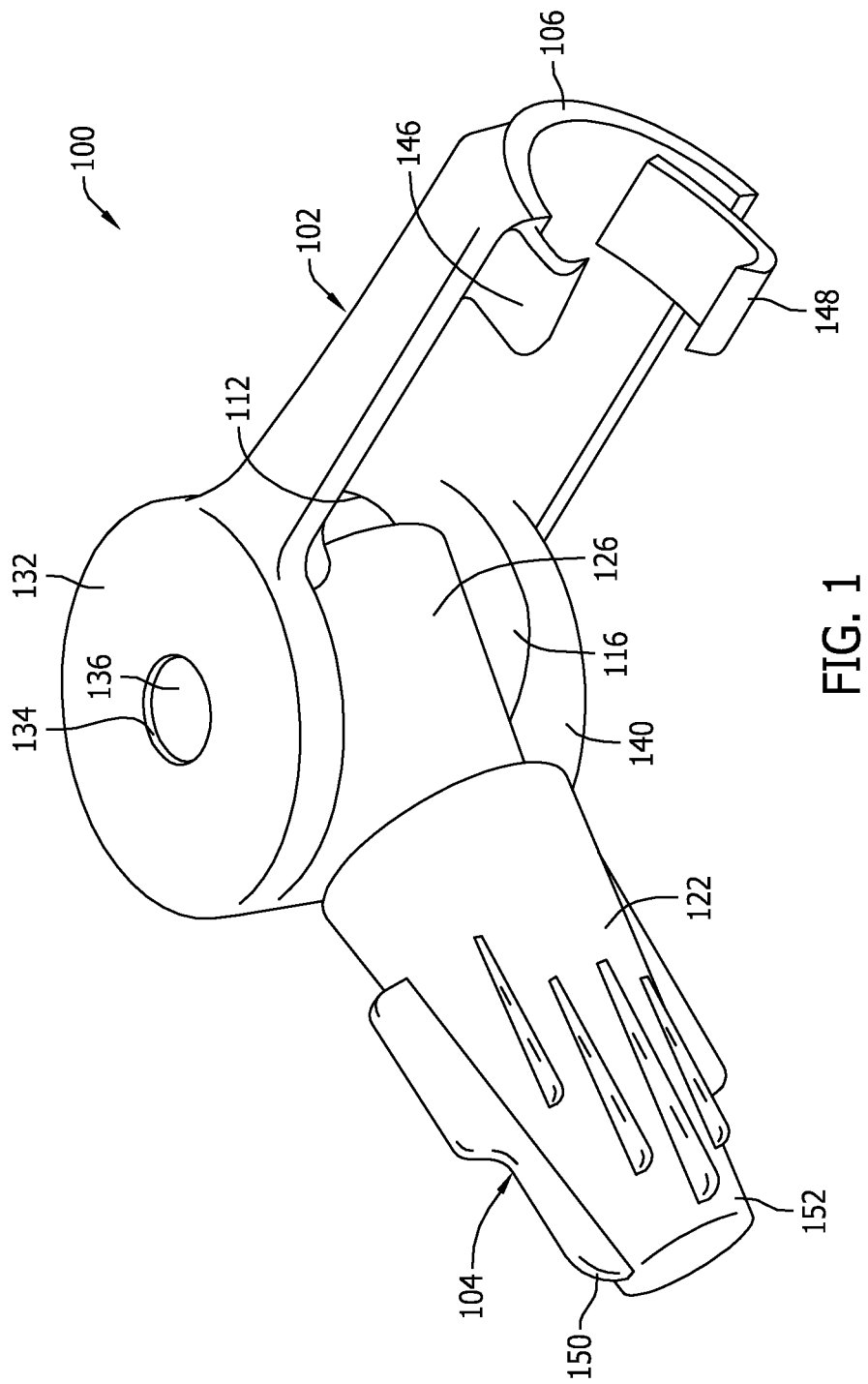
FIG. 1 is a perspective view of an electrical connector according to an example embodiment of the present disclosure, where the electrical connector is shown in a generally receiving position, for example, for receiving wires into the electrical connector.

The present disclosure is generally directed toward electrical connectors that can be used, for example, for electrically connecting wires. The electrical connectors generally include members (e.g., arms, etc.) that are coupled together (e.g., pivotally coupled together, etc.) to allow the members to move relative to each other. For example, the members may be moveable relative to each other between first positions where wires can be inserted into the electrical connectors to be electrically connected and second positions where the electrical connectors operate to bend the connected wires.

In one aspect, the members of the electrical connectors include receptacles configured to receive the wires into the electrical connectors (e.g., when the electrical connectors are in the first positions, etc.) to facilitate electrical connection of the wires. In some embodiments, the electrical connectors include metallic coils positioned within the receptacles to make the electrical connections between the wires. In some embodiments, members of the electrical connectors also, or alternatively, include openings configured to allow the wires to be inserted through the openings and into the receptacles (e.g., when the electrical connectors are in the first positions, etc.). And, upon movement of the members (e.g., from the first positions to the second positions, etc.), the wires in the openings are then bent by the members.

In another aspect, the electrical connectors include sleeves configured to hold insulating material to help coat the wires when the wires are inserted into the electrical connectors. For example, the sleeves may be positioned adjacent the receptacles of the electrical connectors to help coat the wires when the wires are inserted into the receptacles and, for example, prior to receiving the wires in the metallic coils.

It should be appreciated that the electrical connectors of the present disclosure can include one or more of the above described aspects in any desired combination, and can further include any of the other features described herein as desired. With that said, example embodiments of the electrical connectors will now be described more fully with reference to the accompanying drawings.

FIG. 1-10 illustrate an electrical connector 100 according to an example embodiment of the present disclosure. The illustrated electrical connector 100 can be used to make desired electrical connections between wires (e.g., bare ends of wires, etc., not shown) inserted into the electrical connector 100. And, the electrical connector 100 is configured (e.g., sized, shaped, constructed, etc.) to help hold the connected wires in the electrical connector 100 (e.g., against inadvertent, unwanted, etc. removal, etc.). In addition, the electrical connector 100 is configured to inhibit ingress of moisture into the electrical connector 100 where the wires are connected. As such, the electrical connector 100 can provide a durable, reliable, etc. connection and may be used in a wide variety of environments (e.g., indoor environments, outdoor environments, underground environments, etc.), including those that are moist, damp, etc.

Figure 2:
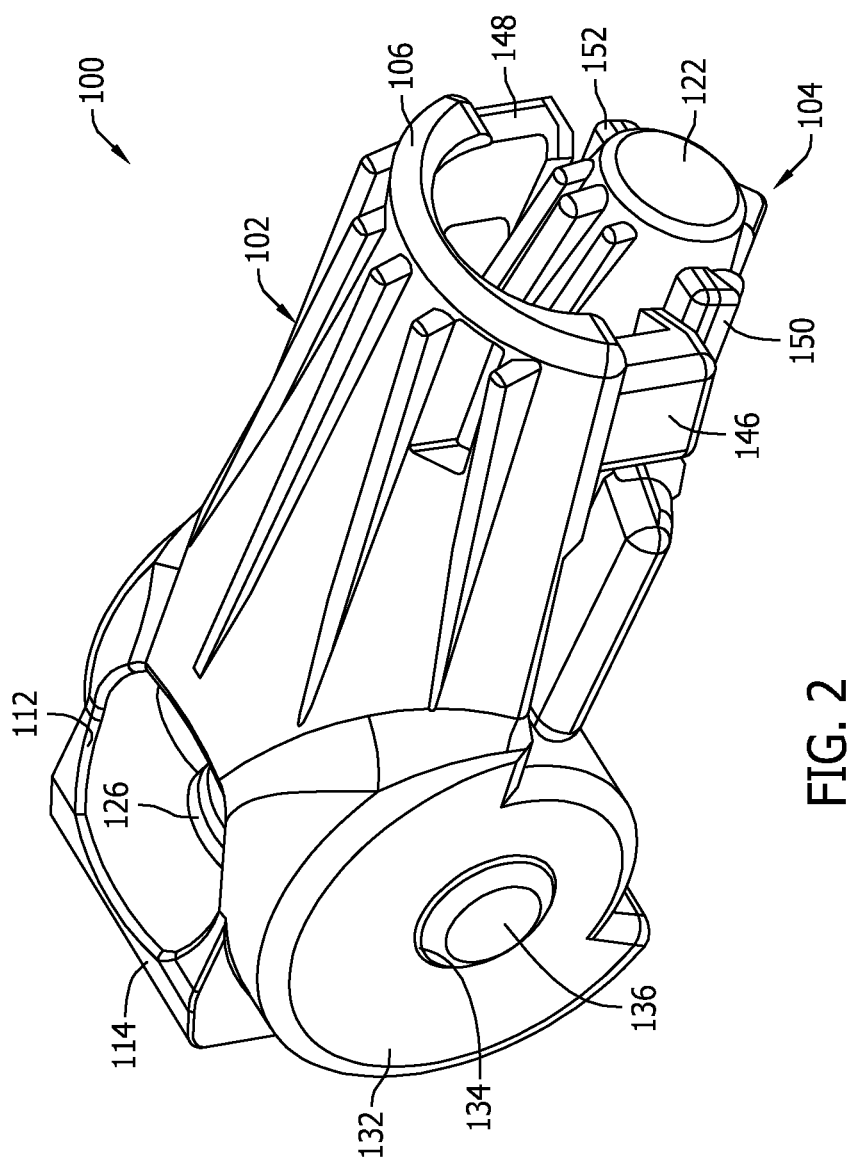
FIG. 2 is a perspective view of the electrical connector of FIG. 1 shown in a generally connecting position.
Figure 3:
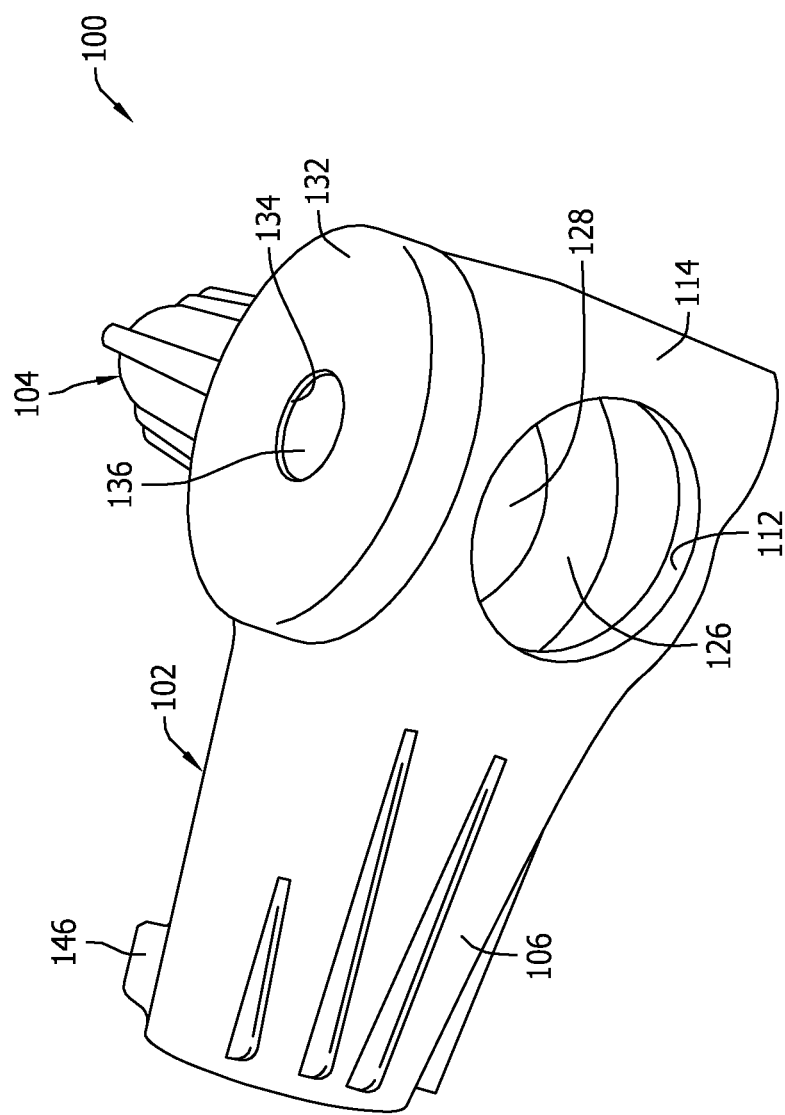
FIG. 3 is a perspective view of the electrical connector of FIG. 1 shown in the generally receiving position.
Figure 4:
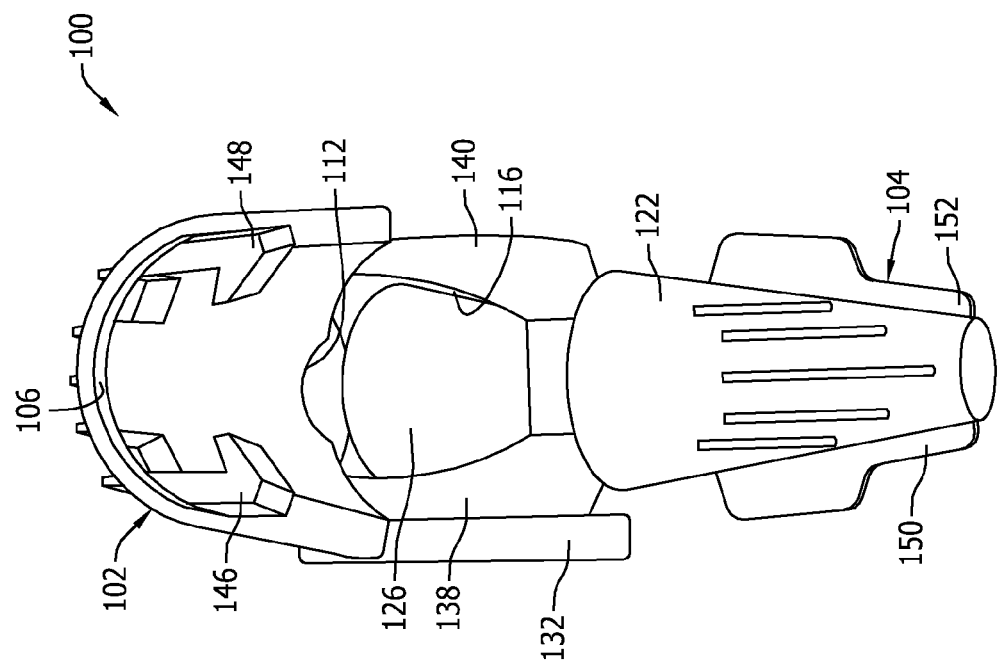
FIG. 4 is another perspective view of the electrical connector of FIG. 1 shown in the generally receiving position.
Figure 5:
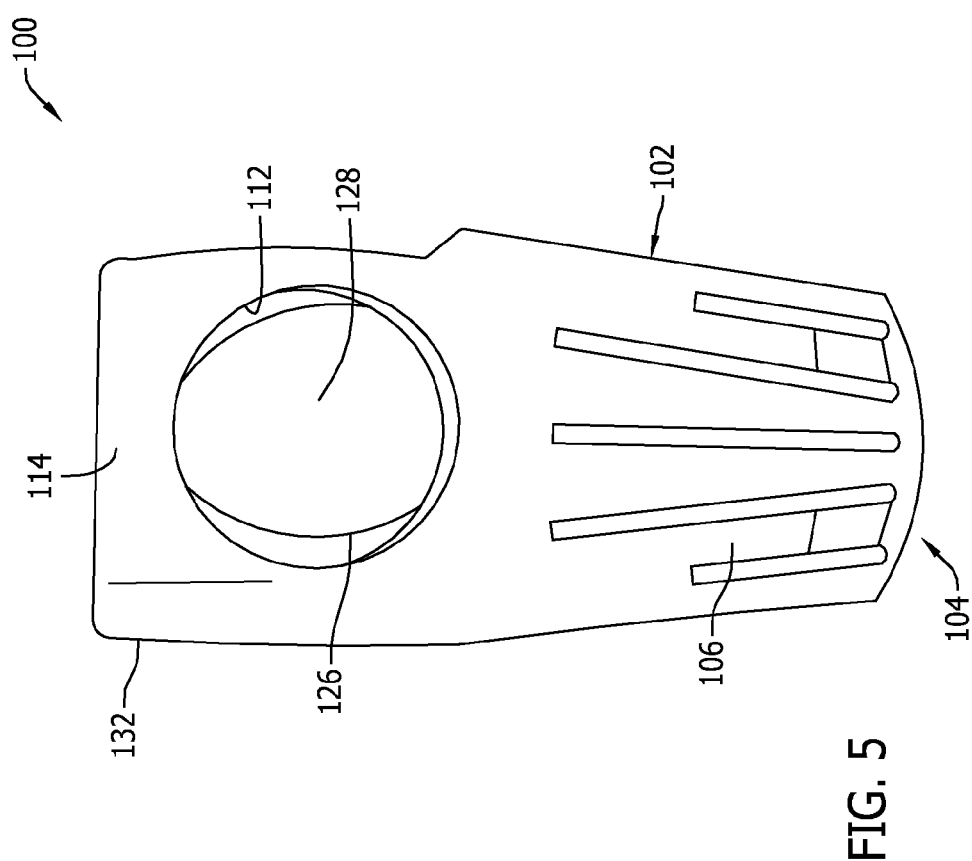
FIG. 5 is another perspective view of the electrical connector of FIG. 1 shown in the generally receiving position.

As shown in FIGS. 1 and 2, the illustrated electrical connector 100 generally includes a first member 102 and a second member 104 (separate from the first member 102) pivotally coupled together. As such, the first member 102 and the second member 104 can pivot relative to each other between a first, receiving position (FIG. 1) in which the first member 102 is oriented relative to the second member 104 at an angle of about ninety degrees, and a second, connecting position (FIG. 2) in which the first member 102 is folded over the second member 104 (with the second member 104 generally nested within an arm portion 106 of the first member 102). Such movement can be facilitated by a user grasping the first and second members 102, 104 and pivoting them as desired. Additional views of the electrical connector 100 in the receiving position and in the connecting position are shown in U.S. Provisional Patent Application No. 61/555,333, which (as stated above) is incorporated herein by reference in its entirety. With that said, in other example embodiments electrical connectors may include first and second members oriented relative to each other at angles greater than about ninety degrees or at angles less than about ninety degrees when in receiving positions.

With additional reference to FIGS. 3-6, the first member 102 of the electrical connector 100 generally includes an opening 112 and a shoulder 114 located adjacent the opening 112. The opening 112 is configured to allow wires (not shown) to be inserted into the electrical connector 100 through the first member 102 (via the opening 112) when the first and second members 102, 104 are in the receiving position. Specifically, the opening 112 allows the wires to be inserted through the first member 102 and into the second member 104 of the electrical connector 100 (as will be discussed in more detail below). Then, when the electrical connector 100 is moved to the connecting position, the shoulder 114 of the first member 102 is configured to engage the inserted wires and bend them, as desired. Here (when the electrical connector 100 is in the connecting position), a channel 116 defined in the second member 104 generally aligns with the opening 112 in the first member 102 (see, e.g., FIG. 6, etc.) and accommodates the bent wires in the electrical connector 100. This may or may not help hold the connected wires in the electrical connector 100 and may or may not provide strain relief to the wires. For example, it is contemplated that the bent wires may still be moved, as needed (e.g., to reorient the wires, reposition the wires, etc.), relative to the electrical connector within the opening 112 of the first member 102 and/or within the channel 116 of the second member 104. As such, in this contemplation, the bent wires may not be secured within the electrical connector 100 between the first and second members 104 at the opening 112 and/or the channel 116.

Figure 6:
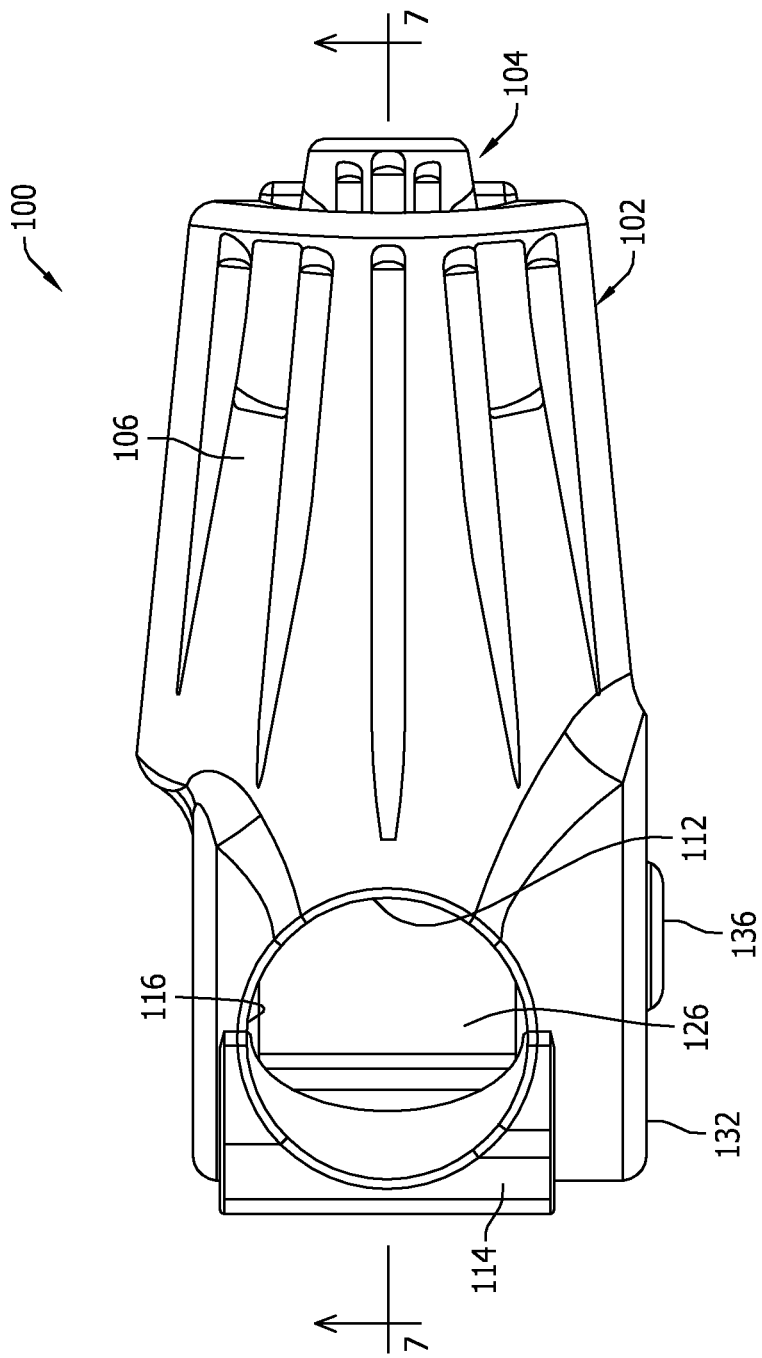
FIG. 6 is a top plan view of the electrical connector of FIG. 1 shown in the generally connecting position.
Figure 7:
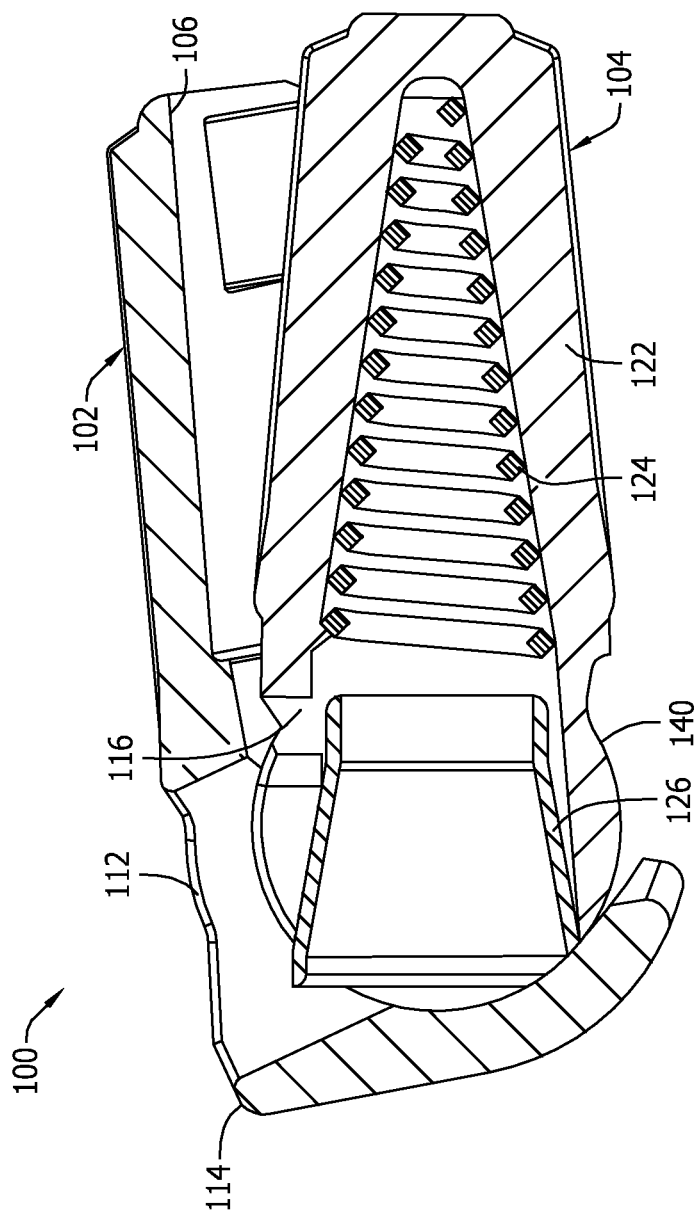
FIG. 7 is a section view of the electrical connector of FIG. 1 taken in a plane including line 7-7 in FIG. 6.

With reference now to FIGS. 6 and 7, the second member 104 of the electrical connector 100 includes a receptacle 122 configured to receive the wires to be electrically connected, and a metallic coil 124 (separate from the second member 104) positioned within the receptacle 122 to make the electrical connection between the wires. In particular, the metallic coil 124 operates to thread onto end portions (e.g., bare end portions, stripped end portions, etc.) of the wires and weave, wrap, tie, twist, etc. the wires together to connect them. For example, the end portions of the wires can be positioned within the metallic coil 124 in the receptacle 122 (through the opening 112 of the first member 102), and the first and second members 102, 104 can then be together turned to thread the metallic coil 124 onto the end portions of the wires (and electrically connect the wires). The metallic coil 124 may be configured to retain the wires in the electrical connector 100 after electrically connecting the wires. To help facilitate this operation, an outer portion of the receptacle 122 is contoured to help a user grasp the second member 104 and turn it as desired. In addition, the orientation of the first and second members 102, 104 when in the receiving position (e.g., with the first and second members 102, 104 oriented at about ninety degrees relative to each other, etc.) also helps the user grasp the first and second members 102, 104 and turn them as desired. The first and/or second members 102, 104 may include other suitable contouring, for example, to help a user grasp them, within the scope of the present disclosure.

In the illustrated embodiment, the metallic coil 124 is inserted into the receptacle 122 of the second member 104 of the electrical connector 100 and secured therein. As such, the metallic coil 124 can turn with the second member 104 relative to wires inserted into the receptacle 122. For example, the metallic coil 124 may be molded directly into the receptacle 122 of the second member 104 (e.g., the receptacle 122 may be molded over, around, etc. the metallic coil 124, etc.). Or, the metallic coil 124 may be secured in the receptacle 122 of the second member 104, for example, adhesive, solder, suitable mechanical fasteners, etc.

Figure 8:
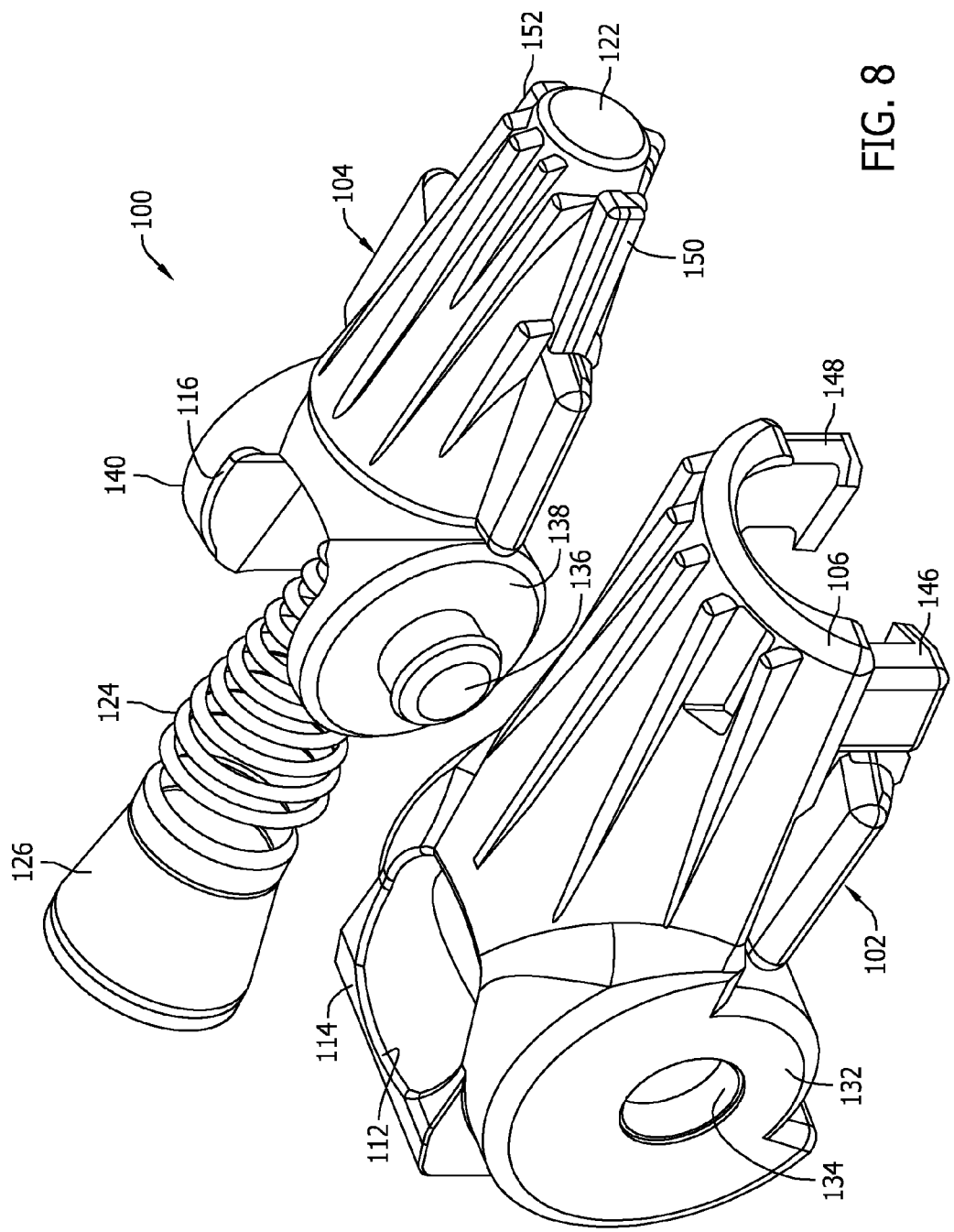
FIG. 8 is an exploded perspective view of the electrical connector of FIG. 1.

With additional reference to FIG. 8, a sleeve 126 is positioned generally above the metallic coil 124 of the electrical connector 100, and adjacent the receptacle 122 of the first member 102 of the electrical connector 100. The sleeve 126 is configured to hold insulating material 128 therein to help coat the wires (e.g., the bare end portions of the wires, etc.) when the wires are inserted into the electrical connector 100 through the opening 112 of the of the first member 102 (and prior to inserting the wires into the metallic coil 124 for electrical connection). In particular, upper and lower end portions of the sleeve 126 are open such that the wires can be inserted through the sleeve 126 (and through the insulting material therein), and then into the metallic coil 124 in the receptacle 122 of the first member 102. This allows the insulating material to initially coat the wires and effectively surround the bare end portions of the individual wires before they are inserted into the metallic coil 124 for connection. As such, the connected portions of the wires will then be coated with the insulating material. With that said, any suitable insulating material may be used with the electrical connector 100. For example, the insulating material may include a moisture resistant encapsulant or gel, and may be a viscous or non-viscous material and/or include a hardening or non-hardening epoxy or potting compound. In addition, the insulating material may have a sufficient viscosity so that it will not flow out of the sleeve 126 (e.g., out of the electrical connector 100, into the metallic coil 124, etc.), but at the same time will move with the wires into the metallic coil 124 and flow around them as they are connected (e.g., to provide a waterproof seal around the connected wires, etc.).

Figure 9:
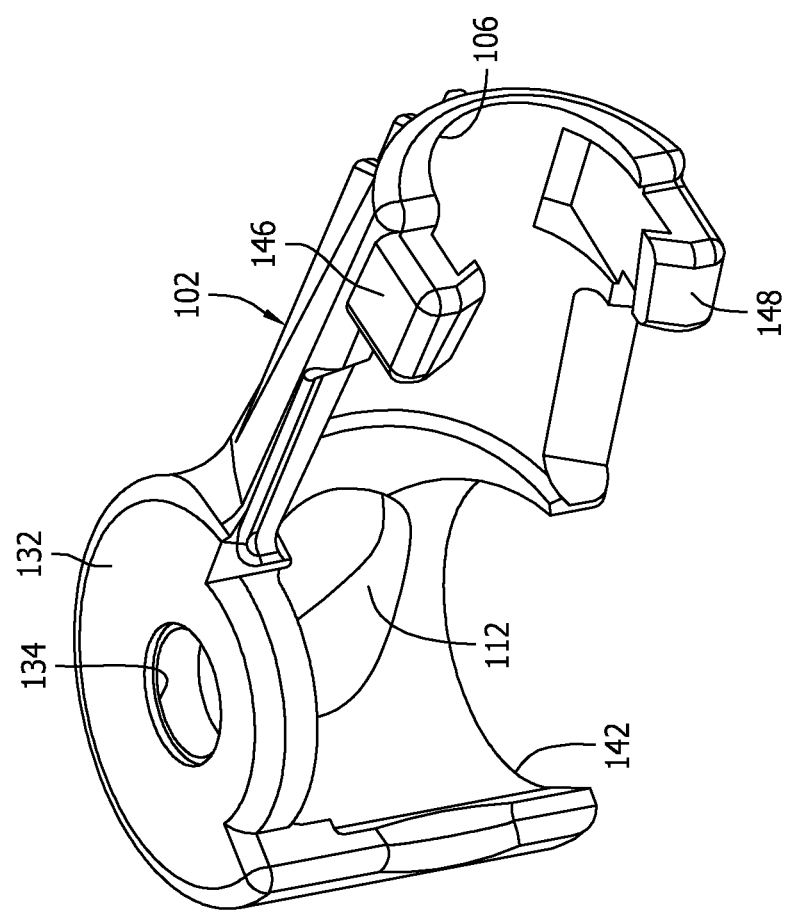
FIG. 9 is a perspective view of a first member of the electrical connector of FIG. 1.
Figure 10:
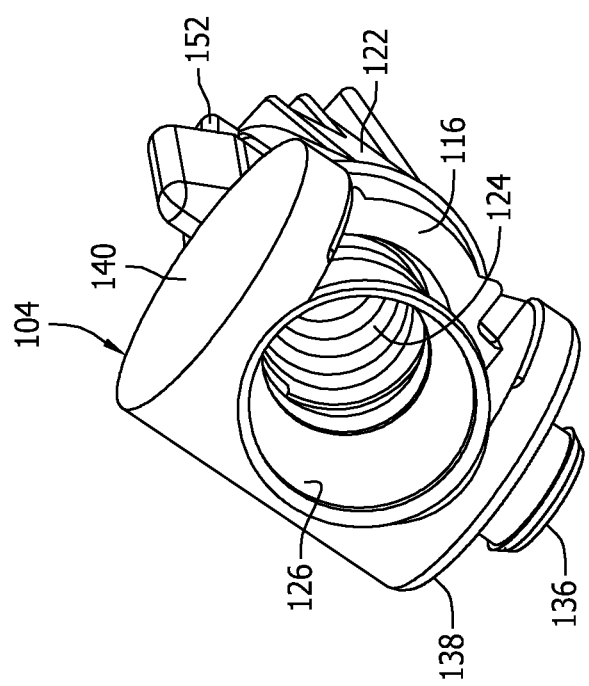
FIG. 10 is a perspective view of a second member of the electrical connector of FIG. 1, with insulating material removed from a sleeve thereof.

With reference now to FIGS. 9 and 10, the first member 102 of the electrical connector 100 also includes a side portion 132 with an opening 134 therein configured to receive a hinge pin 136 formed in a corresponding side portion 138 of the second member 104. The hinge pin 136 operates to couple the separate first and second members 102, 104 together. In particular, when received in the opening 134 of the first member 102, the hinge pin 136 facilitates the pivoting movement of the first and second members 102, 104 between the receiving position and the connecting position (FIGS. 1 and 2). In the illustrated embodiment, the hinge pin 136 is formed as part of the side portion 138 of the second member 104 and is configured to fit within the opening 134 of the side portion 132 of the first member 102 to allow the pivoting movement. In other example embodiments, however, electrical connectors may include separate first and second members coupled together by other suitable means. For example, second members may include hinge pins configured to fit within openings of first members. Or, separate hinge pins may be used and positioned through openings of first and second members to pivotally couple them together.

The second member 104 of the electrical connector 100 also includes a side portion 140 located opposite the side portion 138. The side portion 140 is configured to fit within an opening 142 of the first member 104 when the first and second portions 102, 104 are coupled together. The side portions 138, 140 of the second member 104 help support, balance, stabilize, etc. the first member 102 when coupled to the second member 104. The side portions 138, 140 also provide barriers along the sides of the electrical connector 100 and thus can help inhibit ingress of unwanted debris, etc. into the electrical connector 100.

The first and second members 102, 104 of the electrical connector 100 are also configured to latch together, as desired, when in the connecting position. For example, the first member 102 includes a pair of arms 146, 148 configured to hook over a corresponding pair of tabs 150, 152 of the second member 104. As such, when the first and second members 102, 104 move to the connecting position, the arms 146, 148 can then also be moved over the tabs 150, 152 (e.g., in a snap-fit fashion, etc.) to thereby help hold the first and second members 102, 104 together (e.g., against unwanted, undesired, unintentional movement toward the receiving position, etc.). While not required, this may, in turn, help hold the connected wires in their bent configuration. In addition, while the bent wires may still be moveable relative to the first and second members 102, 104 (within the opening 112 and the channel 116), this may also help inhibit complete unwanted, undesired, unintentional removal of the wires from the electrical connector 100.

An example use of the electrical connector 100 to connect wires will now be described. The first and second members 102, 104 of the electrical connector 100 are initially moved to the receiving position (FIG. 1). Desired wires are then inserted into the electrical connector 100 through the opening 112 in the first member 102 and into the receptacle 122 of the second member 104. The insulating material in the sleeve 126 coats the bare ends of the wires as they move into and through the sleeve 126, and then into the metallic coil 124, for example, to provide a waterproof seal around the bare end portions of the wires. The first and second members 102, 104 are next turned to thread the metallic coil 124 onto the wires to thereby electrically connect them. The first and second members 102, 104 are then moved to the connecting position (FIG. 2). In particular, the first member 102 is pivoted relative to the second member 104, during which the shoulder 114 of the first member 102 bends the connected wires.

Figure 11:
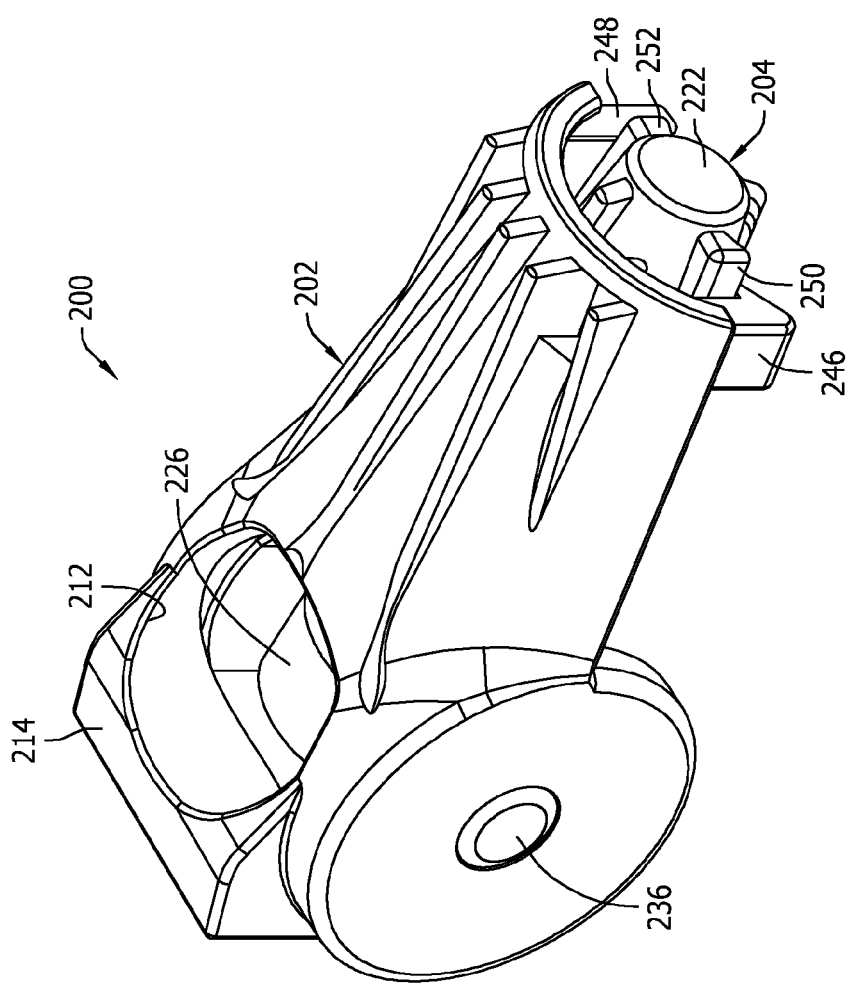
FIG. 11 is a perspective view of an electrical connector according to another example embodiment of the present disclosure.
Figure 12:
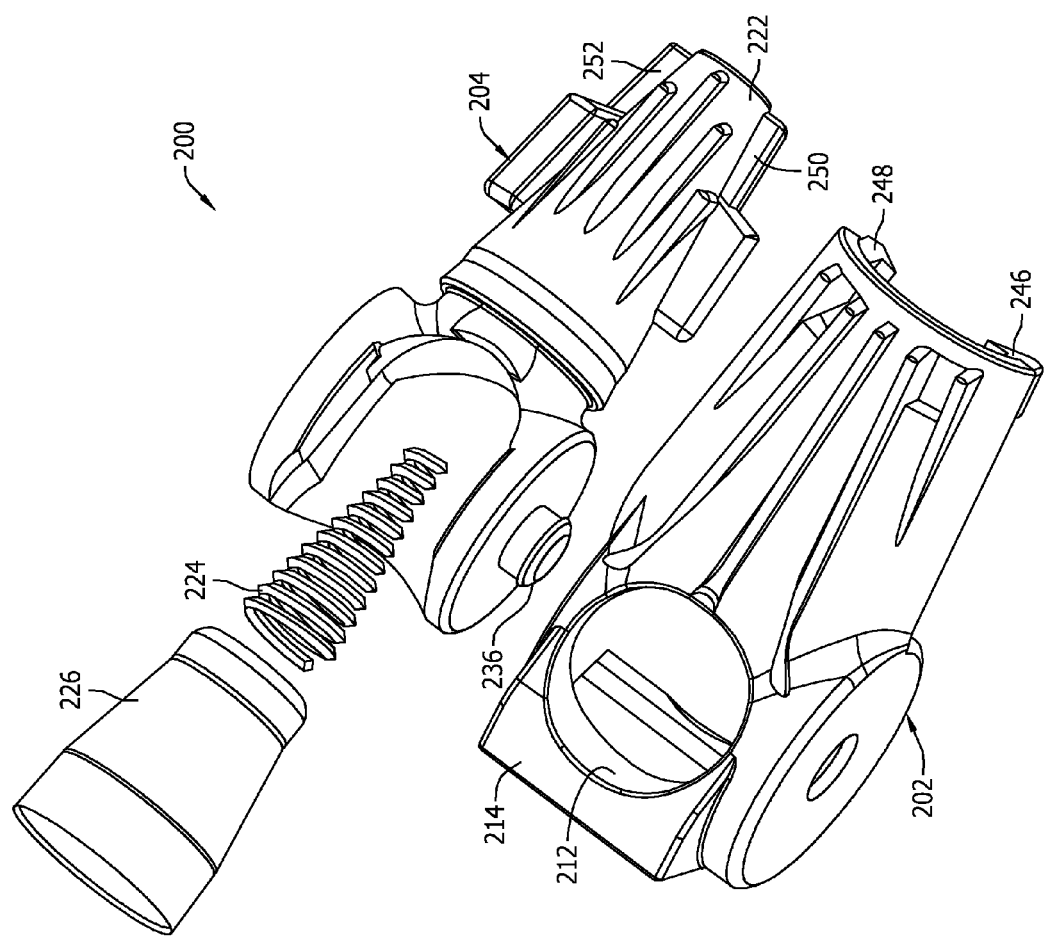
FIG. 12 is an exploded perspective view of the electrical connector of FIG. 11.

FIGS. 11 and 12 illustrate an electrical connector 200 according to another example embodiment of the present disclosure. The electrical connector 200 is substantially similar to the electrical connector 100 previously described and illustrated in FIGS. 1-10. The electrical connector 200 generally includes a first member 202 and a second member 204 pivotally coupled together via a hinge pin 236. The first member 202 includes an opening 212 and a shoulder 214 located adjacent the opening 212. The opening 212 is configured to allow wires to be inserted into the electrical connector 200 through the opening 212, and the shoulder 214 is configured to engage the wires and bend them, as desired, when the first and second members 202, 204 are moved from a receiving position to a connecting position. In addition, the second member 204 includes a receptacle 222 configured to receive the wires to be electrically connected, and a metallic coil 224 positioned within the receptacle 222 to make the electrical connection between the wires. A sleeve 226 is positioned within the receptacle 222 of the first member 202, at a location generally above the metallic coil 224. The sleeve 226 is configured to hold insulating material (not shown) therein to help coat the wires (e.g., the end portions of the wires, etc.) when the wires are inserted into the electrical connector 200 for electrical connection. Further, the first and second members 202, 204 are configured to latch together, as desired, when in the connecting position to help hold the connected wires therein. The first member 202 includes a pair of arms 246, 248 configured to hook over a corresponding pair of tabs 250, 252 of the second member 204.

Figure 13:
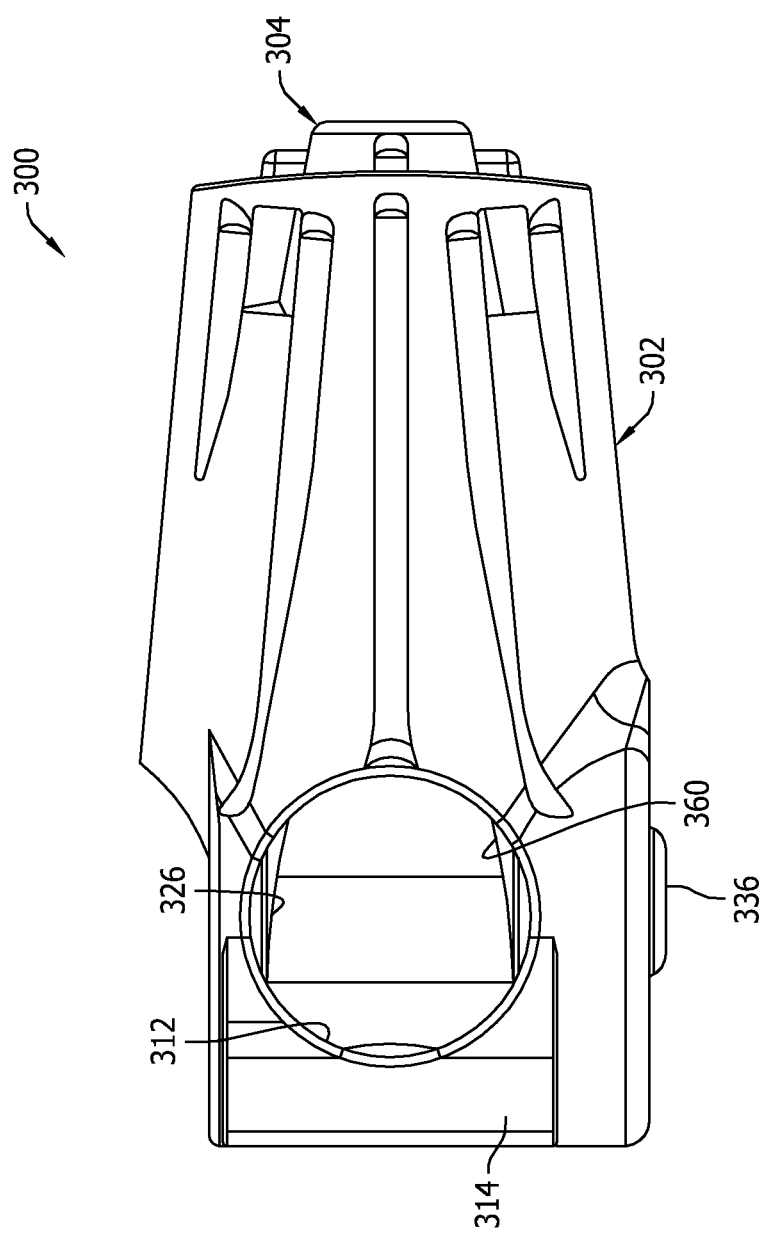
FIG. 13 is a top plan view of an electrical connector according to still another example embodiment of the present disclosure.
Figure 14:
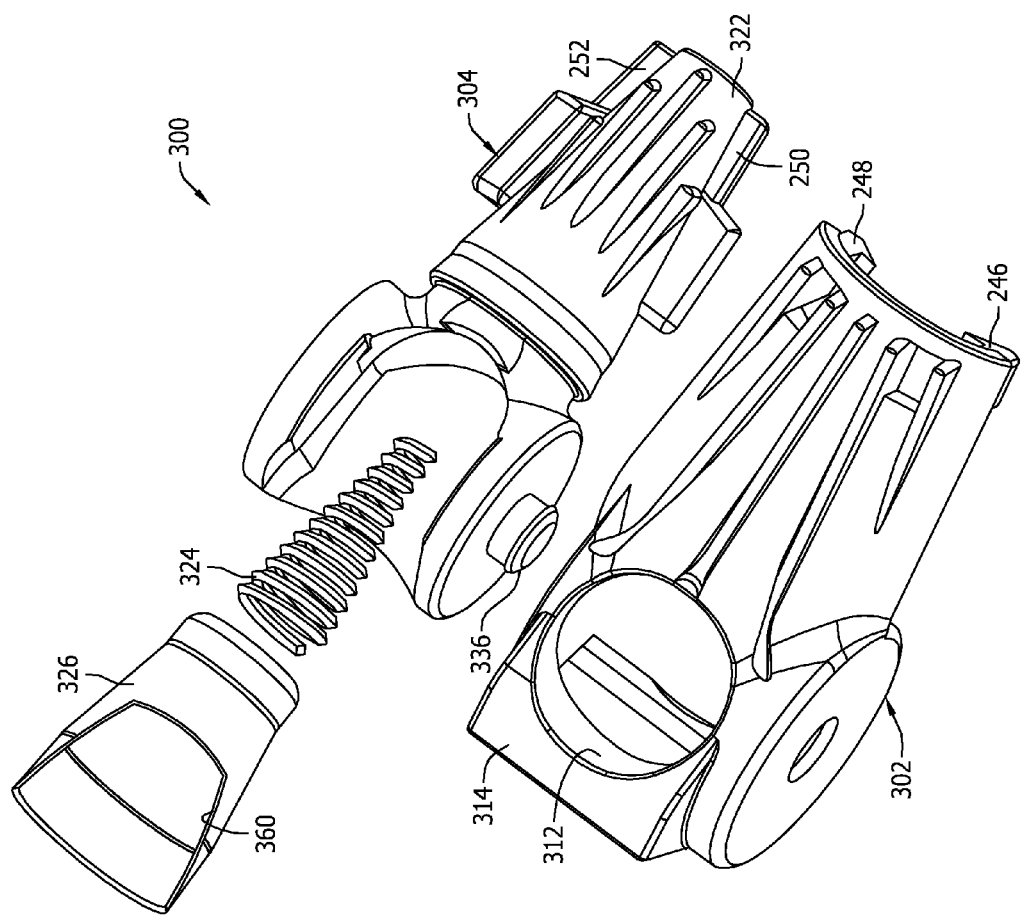
FIG. 14 is an exploded perspective view of the electrical connector of FIG. 13.

FIGS. 13 and 14 illustrate an electrical connector 300 according to another example embodiment of the present disclosure. The electrical connector 300 is again substantially similar to the electrical connector 100 previously described and illustrated in FIGS. 1-10. The electrical connector 300 generally includes a first member 302 and a second member 304 pivotally coupled together via a hinge pin 336. The first member 302 includes an opening 312 and a shoulder 314 located adjacent the opening 312. The opening 312 is configured to allow wires to be inserted into the electrical connector 300 through the opening 312, and the shoulder 314 is configured to engage the wires and bend them, as desired, when the first and second members 302, 304 are moved from a receiving position to a connecting position. In addition, the second member 304 includes a receptacle 322 configured to receive the wires to be electrically connected, and a metallic coil 324 positioned within the receptacle 322 to make the electrical connection between the wires. A sleeve 326 is positioned within the receptacle 322 of the first member 302, at a location generally over the metallic coil 324. The sleeve 326 is configured to hold insulating material (not shown) therein to help coat the wires (e.g., the end portions of the wires, etc.) when the wires are inserted into the electrical connector 300 for electrical connection. Further, the sleeve 326 has a recessed portion 360 formed therein and configured to generally align with the opening 312 in the first member 302 when the electrical connector 300 is in the connecting position.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical connector for electrically connecting wires, the electrical connector comprising:
    first and second members pivotally coupled and moveable between a first position in which the first member is oriented relative to the second member at an angle of about ninety degrees, and a second position in which the first member is folded over the second member, the first member having an opening and the second member having a receptacle; and
    a metallic coil positioned within the receptacle;
    wherein the opening of the first member and the receptacle of the second member are configured to generally align when the first and second members are in the first position such that wires can be inserted through the opening of the first member and into the receptacle of the second member for electrically connecting the wires, and wherein the metallic coil is configured to make the electrical connection between the wires.

2. The electrical connector of claim 1, wherein the metallic coil is coupled to the second member within the receptacle of the second member.

3. The electrical connector of claim 1, wherein the metallic coil is configured to retain the wires in the electrical connector after electrically connecting the wires.

4. The electrical connector of claim 1, further comprising a sleeve positioned adjacent the receptacle of the second member and configured to hold insulating material to help coat the wires when the wires are inserted into the receptacle for electrically connecting the wires.

5. The electrical connector of claim 4, wherein the sleeve includes a recessed portion configured to generally align with the opening of the first member when the first and second members are in the second position.

6. The electrical connector of claim 1, wherein the first member further includes a shoulder configured to bend the wires inserted through the opening of the first member when the first and second members are moved from the first position to the second position.

7. The electrical connector of claim 1, further comprising a hinge pin pivotally coupling the first and second members together.

8. The electrical connector of claim 7, wherein the hinge pin is integrally formed with one of the first and second members.

9. The electrical connector of claim 1, wherein the first member includes a pair of arms and the second member includes a pair of corresponding tabs, and wherein the arms of the first member are configured to hook over the tabs of the second member when the first and second members move to the second position to thereby secure the first and second arms together in the second position.

10. An electrical connector for electrically connecting wires, the electrical connector comprising:
a first member;
a second member pivotally coupled to the first member, the second member having a receptacle configured to receive wires to be connected into the electrical connector;
a metallic coil positioned within the receptacle of the second member and configured to make an electrical connection between the wires received into the electrical connector; and
a hinge pin pivotally coupling the first and second members together, the hinge pin being substantially perpendicular to the receptacle of the second member.

11. The electrical connector of claim 10, wherein the first and second members are moveable between a first position and a second position, the first member having an opening configured to generally align with the receptacle of the second member when the first and second members are in the first position such that wires can be inserted through the opening of the first member and into the receptacle of the second member for electrically connecting the wires; and
wherein the first member is oriented relative to the second member at an angle of about ninety degrees when in the first position, and the first member is folded over the second member when in the second position.

12. The electrical connector of claim 11, wherein the first member further includes a shoulder configured to bend wires inserted through the opening of the first member when the first and second members are moved from the first position to the second position.

13. The electrical connector of claim 10, wherein the metallic coil is coupled to the second member within the receptacle of the second member.

14. The electrical connector of claim 13, wherein the metallic coil is configured to retain the wires in the electrical connector after electrically connecting the wires.

15. The electrical connector of claim 10, wherein the sleeve includes a recessed portion configured to generally align with the opening of the first member when the first and second members are in the second position.

16. The electrical connector of claim 10, wherein the hinge pin is integrally formed with one of the first and second members.

17. An electrical connector for electrically connecting wires, the electrical connector comprising:
first and second members pivotally coupled and moveable between a first position and a second position, the first member having an opening and the second member having a receptacle; and
a metallic coil positioned within the receptacle of the second member;
wherein the opening of the first member and the receptacle of the second member are configured to generally align when the first and second members are in the first position such that wires can be inserted through the opening of the first member and into the receptacle of the second member for electrically connecting the wires, and wherein the metallic coil is configured to make the electrical connection between the wires; and
wherein the opening of the first member is substantially perpendicular to the receptacle of the second member when the first and second members are in the second position.

18. The electrical connector of claim 17, further comprising a hinge pin pivotally coupling the first and second members together.

19. An electrical connector for electrically connecting wires, the electrical connector comprising first and second members pivotally coupled and moveable between a first position in which the first member is oriented relative to the second member at an angle of about ninety degrees, and a second position in which the first member is folded over the second member, the first member having an opening and the second member having a receptacle;
wherein the opening of the first member and the receptacle of the second member are configured to generally align when the first and second members are in the first position such that wires can be inserted through the opening of the first member and into the receptacle of the second member for electrically connecting the wires; and
wherein the first member includes a pair of arms and the second member includes a pair of corresponding tabs, and wherein the arms of the first member are configured to hook over the tabs of the second member when the first and second members move to the second position to thereby secure the first and second arms together in the second position.

* * * * *